United States Patent Office 3,277,197
Patented Oct. 4, 1966

3,277,197
PROCESS AND CATALYST FOR THE HYDRODE-ALKYLATION OF ALKYL AROMATIC HYDROCARBONS
Bruno Notari, San Donato Milanese, Italy, assignor to SNAM S.p.A., Milan, Italy, a company of Italy
No Drawing. Filed Aug. 7, 1963, Ser. No. 300,621
Claims priority, application Italy, Aug. 10, 1962, 692,833
5 Claims. (Cl. 260—672)

This invention concerns a process and a catalyst for the catalytic hydrodealkylation of alkyl aromatic hydrocarbons, and is particularly intended for the production of benzene and naphthalene by catalytic dealkylation of methyl- and/or ethyl-substituted benzenes and naphthalenes.

The petrol industry has available petroleum fractions essentially constituted by mixtures of alkyl benzenes and/or alkyl naphthalenes, in particular of alkyl aromatics wherein the alkyl group is methyl. The transformation of these products into the non-substituted corresponding aromatics, namely benzene and naphthalene, is convenient from the economical point of view, and is an object of great interest in the present development of petroleum chemistry.

The dealkylation of methyl-aromatics can be carried out thermally as well as catalytically, using in both cases hydrogen under pressure and at more or less elevated temperatures. The catalytic processes however afford various advantages over the thermal ones, first among which the use of more moderate temperatures; owing to the contemporaneous presence in hydrogen reactors under elevated pressure, this factor greatly reduces the cost of the plants.

With the catalytic processes described in literature for the production of aromatic hydrocarbons through the dealkylation of alkyl-aromatics, which generally proceed at temperatures of from 450 to 700° C., under hydrogen pressure of from 1 to 100 atmospheres, various types of catalysts are employed, which generally include a metal of the eighth group, a metal of the sixth group or their oxides supported on porous materials such as alumina, silica, silica-alumina. Though the catalytic materials employed are different, none of them is really quite satisfactory. If one take into account that the hydro-dealkylation reaction

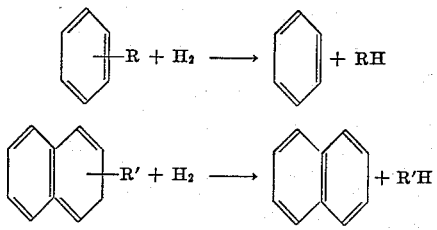

leads to the replacement of a radical R(—CH₃—C₂H₅, etc. . . .) by a hydrogen atom, namely that it proceeds with a conspicuous ponderal diminution due to the stoichiometry of the reaction, it will be understood how it becomes indispensable to improve at maximum the selectivity of the reaction, to avoid all the further losses due to collateral reactions.

Hence it is a main object of the present invention to elevate the yields of dealkylated product obtainable by a process of catalytic dealkylation, through the use of a catalytic agent more selective than those known at present.

Taking into account that the speed of dealkylation of the alkyl-aromatics depends strictly on the temperature of the catalyst mass, on the partial pressure of hydrocarbon and hydrogen, and on the ratio between the amount of substance put to react by unit of time and unit of catalytic mass, namely on the space velocity, it is also a distinct object of the present invention to improve, at equal experimental conditions, the velocity of dealkylation, namely the conversions into dealkylated product, of course without diminishing the selectivity of the catalyst, namely keeping elevated yields. Both these factors tend to result in larger quantities of dealkylated product at equal load and equal technical characteristics of the plants.

It has now been found that it is possible to attain both these results through the use of oxides or sulfides of the metals of the sixth group supported on alumina of high purity preferably in the eta phase characterized by an elevated porosity, by a surface area of about 150 to 200 m.²/gr., and by an average diameter of the pores of more than 150 A. lower than 550 A. and preferably around 250 A.

To obtain these characteristics the aluminas should be prepared by particular processes since the commercial aluminas have chemical and physical parameters quite different from these optimal ones.

It is not known whether this particular and advantageous behaviour is related to the crystalline structure of the support or instead to its physical structure understood as a surface area, and pore size. At any rate it has been observed that every time an oxide or sulfide of the metals of the six group B is supported on these particular aluminas the results are definitely better than those obtainable with commercial aluminas; from what has been said it follows that the aluminas utilizable according to the instant process cannot be tabletted or at any rate obtained through a procedure involving pressing because during this operation the porosity of the material is partly destroyed. Instead it is necessary to obtain them by a procedure imparting to the final product the desired chemical and physical structure, in addition of course to good mechanical properties that permit the industrial use thereof.

For a certain optimal chemical and physical structure the conversion obtainable under standard experimental conditions is considerably larger than with catalysts having different structure; moreover the yield is slightly improved by the convenient selection of the structure of the support. Modification of which, therefore, is not limited to increasing the velocity of the hydrodealkylation reaction, which is a fundamental factor, for a more intensive exploitation of the catalyst systems, but also succeeds in improving the selectivity of the reaction, minimizing the collateral cracking reactions, which generically lead to the formation of hydrocarbons different from the desired ones or to a coke deposit on the catalyst.

In order better to illustrate the present invention the following examples are reported which should not be considered as a limitation thereof.

EXAMPLE 1

Various catalysts essentially constituted by chromium oxide on alumina were prepared by impregnation of commercial aluminas calcined at 550° C. The impregnation was made with a solution of chromic acid in sufficient quantity to obtain a final product constituted by alumina with 16% of chromium oxide; the reduction was effected with hydrogen at 300° C. The commercial aluminas utilized for this purpose were the Harshaw H-0104 alumina, and the Alcoa F-10 alumina. The characteristics of these aluminas are reported in the following table:

Table 1.—*Chemical and physical characteristics of commercial aluminas*

| Properties | Harshaw-0104 | Alcoa F-10 |
|---|---|---|
| Surface area, m.²/gr | 116 | 100 |
| Porosity, ml./gr | 0.34 | 0.3 |
| Average diameter of pores, A | 113 | 80 |
| Real density, gr./ml | 3.2 | 3.2 |
| Density on charging, kg./liter | 1 | 1 |

A porous alumina according to the present invention was obtained in the following way: to a solution of $AlCl_3$ is added a cooled solution of hexamethylene tetramine with 30% of water; then it is covered with a layer of paraffin and put into an oven at 90° C. for 24 hours. At the end of this period the mass is completely gelified. It is extracted from the vessel, cut into cubes of 1 cm. side-length and put into a separator funnel kept at 70° C. by means of a jacket in which water from a thermostat circulates. It is then washed by distilled water brought to pH 11 with ammonia, and the washing is carried on for 20 hours. At the end of the washing, the material is put into an oven at 95° C. and after some hours the most of the water has been eliminated. At this time the alumina shows at the X-rays the prevailing structure of the bayerite trihydrate. It is put into a muffle furnace and gradually heated up to 550° C. The alumina so obtained has high purity and has the characteristics tabulated in Table 2.

Properties: Porous alumina
- Crystalline structure _____ eta
- Surface area, m.²/gr. _____ 138
- Porosity _____ 0.9
- Average pore diameter, A. _____ 263
- Real density gr./ml. _____ 3.2
- Apparent density gr./ml. _____ 0.9
- Charging density kg./liter _____ 0.5

From this porous alumina a catalyst was prepared with 16% $Cr_2O_3$ by the same process followed for commercial aluminas; said catalyst will be hereinafter indicated as porous alumina with 16% $Cr_2O_3$. The catalysts so prepared were tested for the hydrodealkylation of toluene to benzene in a high-pressure apparatus of stainless steel. The temperature along the catalytic bed was checked and the differences between the various points of the bed were smaller than 3° C. The results obtained are tabulated in Table 3, in which are also reported the results obtained by utilizing two commercial dealkylating catalysts, the Girdler G-41 and the C-30 of Catalyst and Chemicals Inc.

From this one can observe that the behaviours of the catalyst prepared according to the present invention, is definitely superior and provides higher conversions with respect to the catalysts prepared from commercial aluminas and with respect to the C-30 catalyst of C.C.I. and the Girdler G-41 catalyst. In Table 3 are also reported the values of conversions, for a catalyst which, after long time use, was regenerated. It will be noticed that the conversions and yields are identical to those of the fresh catalyst, whereby is proved that neither during regeneration nor during operation there takes place a diminution of the excellent properties of the catalyst. Note from Table 3 that the comparison between the various catalysts, from which appears the superior behaviour of the one according to the present invention, was made at equal volume. Actually if the comparison had been made at equal weight, the catalyst prepared from porous alumina would prove to be more effective by more than 100%. In practice that means a further advantage deriving from the use of a smaller quantity by weight of catalyst.

Table 3

| Catalyst | Ml. | Gr. | Molar H₂ to toluene ratio | Reaction temperature, °C. | Pressure, atm. | HLSV, ml./ml., cat./hr. | Percent of benzene in the reaction product | Stoichiometric yield (percent of theory) |
|---|---|---|---|---|---|---|---|---|
| (a) Harshaw plus 16% $Cr_2O_3$ | 50 | 58.2 | 3 | 620 | 40 | 1 | 50.1 | 95.4 |
| (b) C-30 | 50 | 50.1 | 3 | 620 | 40 | 1 | 50.7 | 95.7 |
| (c) Alcoa [1] plus 16% $Cr_2O_3$ | 50 | 57.9 | 3 | 620 | 40 | 1 | 45.6 | 99.5 |
| (d) Girdler-G-41 | 50 | | 3 | 620 | 40 | 1 | 50.5 | 95.3 |
| (e) $Al_2O_3$ porous plus 16% $Cr_2O_3$ | 50 | 29.8 | 3 | 620 | 40 | 1 | 68.4 | 96.5 |
| (f) $Al_2O_3$ porous plus 16% $Cr_2O_3$ after regenerating | 50 | 29.8 | 3 | 620 | 40 | 1 | 69.7 | 96.6 |

[1] The values reported are the average values observed during the first 25 hours of operation. The life of the catalyst, however, is much more elevated.

EXAMPLE 2

Also in the dealkylation of the methylnaphthalenes the catalyst according to the present invention displayed higher activity than previously known catalysts. By way of example, in Table 4 are tabulated the results obtained in the dealkylation of 1-methyl naphthalene with a commercial catalyst (C-30) and with the catalyst prepared from porous alumina.

Table 4.—*Hydrodealkylation of 1-methylnaphthalene*

| Catalyst | Ml. | Gr. | Reaction Temperature, °C. | Pressure, atmospheres | HLSV, ml./ml., cat./hr. | Percent of naphthalene in the reaction mixture | Stoichiometric yield, percent of theory |
|---|---|---|---|---|---|---|---|
| C-30 | 50 | 50.1 | 540 | 40 | 1 | 66.1 | 97.7 |
| $Al_2O_3$ porous plus 16% $Cr_2O_3$ | 50 | 29.8 | 540 | 40 | 1 | 87.5 | 98.7 |

Hence also in the hydrodealkylation of methyl naphthalene to naphthalene the use of the catalyst according to the present invention is considerably more convenient.

EXAMPLE 3

The good characteristics found in the catalyst prepared from porous alumina which chromium oxide are observed also if on the porous alumina are deposited other oxides or sulfides of the VIth Group. For instance in Table 5 are tabulated the results obtained with a catalyst prepared by impregnating the porous alumina aforedescribed with molybdenum sulfide.

Clearly too elevated an average diameter of the pore leads to a diminution of the velocity of dealkylation. Hence an interval remains defined, as to the average diameter of the pores, between 150 and 550 A., in which the catalytic activity passes through a maximum.

I claim:

1. A process for obtaining benzene and naphthalenes with elevated conversions from methyl and ethyl derivatives by means of catalytic hydrodealkylation, comprising bringing a charge containing said derivatives into contact, at temperatures between 500° C. and 650° C. and pressures between 1 and 100 atmospheres, with a catalyst

*Table 5*

| Catalyst | Ml. | Gr. | Temperature, °C. | Pressure, atmospheres | HLSV, ml./ml., cat./hr. | Percent of benzene in the reaction product | Stoichiometric yield, percent of theory |
|---|---|---|---|---|---|---|---|
| $Al_2O_3$ porous plus 15% $MoS_2$ | 50 | 30.1 | 620 | 40 | 1 | 70.3 | 95.7 |

EXAMPLE 4

The elevated specific activity of the catalyst described in the present invention permits the utilization of catalytic compositions containing minor quantities of chromium oxide, as can be seen in Table 6 wherein are reported the results obtained with a catalyst having 6% of chromium oxide.

comprising a material selected from the group consisting of oxides and sulfides of metals of the VIth group B uniformly distributed and supported on alumina of high purity, of porosity not lower than 0.5 ml./gr., and not higher than 1.8 ml./gr. and with pores having an average diameter between 150 and 550 A., 70% of the pores having a diameter between 150 and 550 A.

*Table 6.—Hydrodealkylation of toluene*

| Catalyst | Ml. | Gr. | Temperature, °C. | Pressure, atmospheres | HLSV, ml./ml., cat./hr. | Percent of benzene in the reaction product | Stoichiometric yield, percent of theory |
|---|---|---|---|---|---|---|---|
| $Al_2O_3$ porous plus 6% $Cr_2O_3$ | 50 | 28.5 | 620 | 40 | 1 | 68.8 | 95.9 |

This constitutes a further economical improvement due to the use of minor quantities of chromium oxide on the catalyst.

EXAMPLE 5

A catalyst was prepared with aluminum having low density, having an average pore diameter of 550 A. and a total porosity of 1.8 ml./gr. to determine whether a further increase in the average diameter of the pores leads still to an increase of the velocity of dealkylation.

The results are reported in Table 7.

2. A process according to claim 1, wherein the supported material is selected from the group consisting of chromium oxide and molybdenum sulfide, and wherein the alumina has a surface area of about 150 to 200 m.²/gr.

3. A process according to claim 1, wherein the oxide of the metal of the VIth group is chromium oxide.

4. A process according to claim 3, wherein the chromium oxide is present in the catalyst in amount lower than 10%.

5. A process according to claim 1, wherein the sulfide of metal of the VIth group is molybdenum sulfide.

*Table 7.—Hydrodealkylation of toluene*

| Catalyst | Ml. | Gr. | Temperature, °C. | Pressure, atmospherers | HLSV, ml./ml., cat./hr. | Percent of benzene in the reaction product | Stoichiometric yield, percent of theory |
|---|---|---|---|---|---|---|---|
| Low density $Al_2O_3$ plus 16% $Cr_2O_3$ | 50 | 28.5 | 620 | 40 | 1 | 49.2 | 95.8 |

References Cited by the Examiner

UNITED STATES PATENTS

| | | | |
|---|---|---|---|
| 3,053,760 | 9/1962 | Henke et al. | 252—466 X |
| 3,067,128 | 12/1962 | Kimberlin et al. | 252—465 X |
| 3,075,022 | 1/1963 | Gammon et al. | 260—672 |
| 3,116,345 | 12/1963 | Slaymaker | 252—439 X |
| 3,204,007 | 8/1965 | Mukai et al. | 260—672 |

DELBERT E. GANTZ, *Primary Examiner.*

C. R. DAVIS, *Assistant Examiner.*